United States Patent
Feldtkeller

(10) Patent No.: US 7,012,819 B2
(45) Date of Patent: Mar. 14, 2006

(54) METHOD FOR OPERATING A SWITCHING CONVERTER AND DRIVE CIRCUIT FOR DRIVING A SWITCH IN A SWITCHING CONVERTER

(75) Inventor: Martin Feldtkeller, München (DE)

(73) Assignee: Infineon Technologies AG, München (DE)

( * ) Notice: Subject to any disclaimer, the term of this patent is extended or adjusted under 35 U.S.C. 154(b) by 34 days.

(21) Appl. No.: 10/850,971

(22) Filed: May 21, 2004

(65) Prior Publication Data
US 2005/0213358 A1    Sep. 29, 2005

(30) Foreign Application Priority Data
May 21, 2003   (DE) .................................. 103 22 870

(51) Int. Cl.
H02M 3/335    (2006.01)
(52) U.S. Cl. ..................................... 363/21.01; 363/97
(58) Field of Classification Search .................. 363/20, 363/21.01, 95, 97, 131
See application file for complete search history.

(56) References Cited

U.S. PATENT DOCUMENTS

| | | | |
|---|---|---|---|
| 4,660,133 A * | 4/1987 | Stasch | 363/19 |
| 5,130,561 A * | 7/1992 | Elliott et al. | 307/31 |
| 5,748,461 A | 5/1998 | Preller | |
| 6,229,716 B1 | 5/2001 | Preller | |
| 6,275,018 B1 | 8/2001 | Telefus et al. | |
| 6,304,473 B1 | 10/2001 | Telefus et al. | |
| 2002/0105815 A1 | 8/2002 | Preller | |
| 2004/0057256 A1 | 3/2004 | Feldtkeller | |

FOREIGN PATENT DOCUMENTS

| | | |
|---|---|---|
| DE | 44 37 459 C1 | 11/1995 |
| DE | 197 32 169 A1 | 4/1999 |
| DE | 199 39 389 A1 | 3/2001 |
| DE | 10242218.4 B3 | 6/2004 |

* cited by examiner

Primary Examiner—Adolf Berhane
(74) Attorney, Agent, or Firm—Maginot Moore & Beck

(57) ABSTRACT

The present invention relates to a method for operating a switching converter which has input terminals for the application of an input voltage, output terminals for the provision of an output voltage, a series circuit comprising an inductive energy storage element and a switch driven in clocked fashion, said series circuit being coupled to the input terminals, and a rectifier circuit, which couples the inductive energy storage element to the output terminals, and in which a control signal dependent on the output voltage is generated. The method provides for operating the switching converter in a manner dependent on the magnetization duration of the inductive energy storage element during a drive period of the switch in the free-running or fixedly clocked operating state. The invention additionally relates to a drive circuit for driving a switch in a switching converter for carrying out this method.

25 Claims, 8 Drawing Sheets

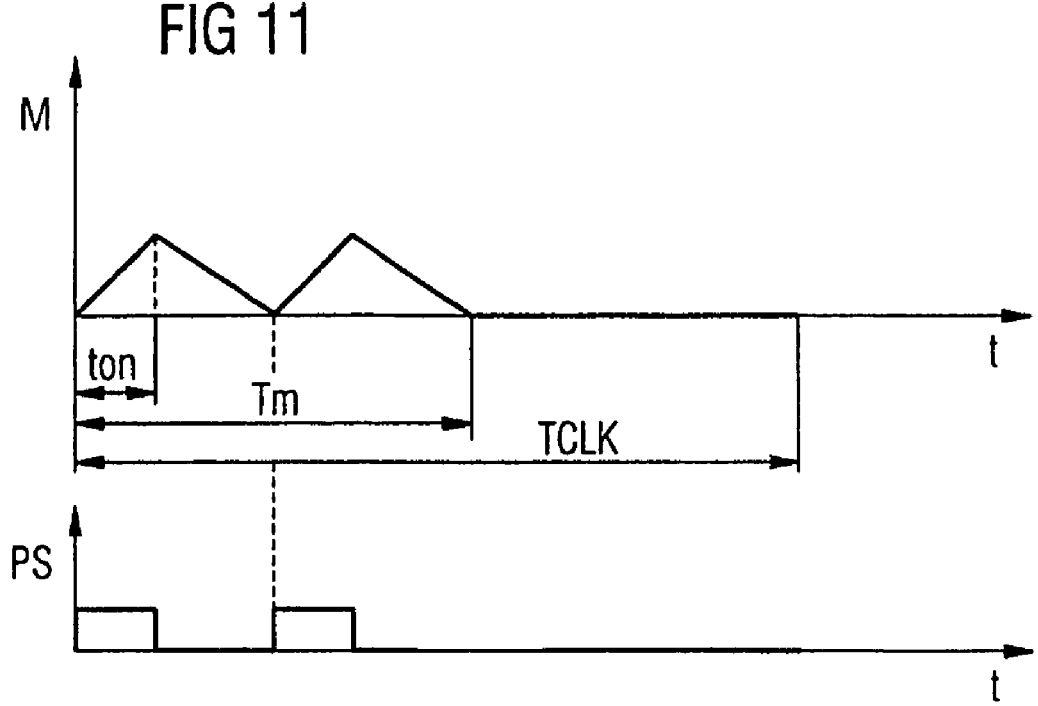
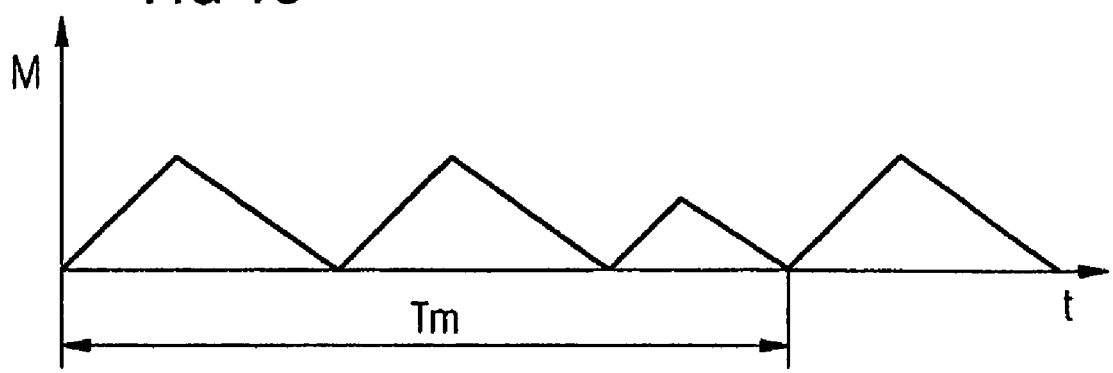

METHOD FOR OPERATING A SWITCHING CONVERTER AND DRIVE CIRCUIT FOR DRIVING A SWITCH IN A SWITCHING CONVERTER

FIELD OF THE INVENTION

The present invention relates to a method for operating a switching converter and a drive circuit for use in a switching converter.

BACKGROUND

With regard to their operating mode, a distinction is made between free-running and fixedly clocked switching converters, which are fundamentally identical in their construction but differ in respect of the manner of clocked driving of the switch which is connected in series with the inductive energy storage element and controls the power consumption.

Free-running switched-mode power supplies are sufficiently known for the DC voltage supply of loads, such as, for example, computers, monitors, television sets or the like. The basic construction and the method of operation of such a switched-mode power supply are described for example in DE 197 32 169 A1. For driving the switch which is present in such power supply units and controls the power consumption, use is usually made of integrated circuits, such as, for example, drive modules of the TDA 4605 or TDA 16846 type, which are available from the applicant.

In order to provide a better understanding of the invention explained below, firstly the basic construction and the basic method of operation of a conventional free-running flyback converter switched-mode power supply and of a conventional fixedly clocked flyback converter switched-mode power supply will be explained with reference to FIGS. 1 to 3.

The switching converter comprises input terminals EK1, EK2 for the application of a rectified input voltage Uin, and output terminals AK1, AK2 for the provision of an output voltage Uout for a load. A transformer Tr is provided for converting the input voltage Uin into the output voltage Uout, the primary coil Lp of the said transformer being connected in series with a semiconductor switch T1 between the input terminals EK1, EK2, and the secondary coil Ls of said transformer being connected to the output terminals AK1, AK2 via a rectifier arrangement GL. In the case of such a flyback converter switched-mode power supply, the primary coil Lp takes up energy from the input voltage Uin while the switch is closed, and emits this energy to the load via the secondary coil Ls and the rectifier arrangement GL when the switch is subsequently opened.

The task of such power supply units is to keep the output voltage Uout constant in a manner largely independent of fluctuations in the power consumption of the load and the input voltage. A control loop is present for controlling the output voltage or the power consumption of the switched-mode power supply and has a control signal RS which is derived from the output voltage Uout and determines the power consumption of the switched-mode power supply. This control signal RS is fed to a drive circuit 20, which provides a drive signal PS for clocked driving of the switch.

The drive signal PS comprises a sequence of drive pulses, the time duration of the individual drive pulses, that is to say the switch-on duration of the switch, being dependent on the control signal RS, and said time duration rising as the power demand of the load increases, in order to keep the output voltage Uout constant. The points in time at which the switch is closed in a free-running/quasi-resonant switching converter are dependent on the magnetization state of the inductive energy store and usually prescribed by points in time at which the primary coil Lp has emitted the previously stored energy to the secondary side Ls, and is thus demagnetized. Such magnetization states of the primary coil are detected by means of an auxiliary coil Lh, which is coupled to the primary coil and is likewise connected to the drive circuit IC.

By way of example, FIG. 2 shows the temporal profile of a drive signal PS, the power consumption Pin and the magnetization M of the primary coil Lp for a switching converter operated in free-running fashion. These signal profiles are in each case illustrated for a first value of the control signal RS in the left-hand part and for a second value of the control signal RS in the right-hand part. In this case, the second value of the control signal is less than the first value of the control signal, so that the second control signal value results in shorter switch-on durations ton than the first control signal value, as shown in FIG. 2.

After the closing of the switch, an input current Iin flowing through the primary coil rises in each case linearly proceeding from zero. With a constant input voltage Uin, the power consumption Pin is proportional to the current consumption and has the ramp-shaped profile illustrated. In a corresponding manner, the magnetization M rises linearly after the switch-on and falls linearly after the switch-off during the time durations toff, the switch being switched on again in the case of free-running operation when the magnetization has decreased to zero. In this case, the demagnetization time of the primary coil Lp is proportional to the magnetization time.

A switching period of the switch is determined by the time duration between the beginning of two successive switch-on pulses of the drive signal PS. In this case, the energy consumed by the power supply unit is proportional to the area under the curve for the power consumption Pin and is proportional to the area under the curve for the magnetization M. The mean power consumed results from the energy consumed per on/switching period. Assuming that the input voltage Uin is constant for at least a few switching periods, this mean power is proportional to the switch-on duration ton and is thus proportional to the control signal RS. Owing to the proportionality of the demagnetization duration with respect to the switch-on duration, the magnetization durations Tm illustrated in FIG. 2, which results from the switch-on duration and the demagnetization time, are also proportional to the control signal.

In the case of a fixedly clocked operation of the switching converter, the switch T1 is switched on in a fixed clock cycle prescribed by a clock signal Tclk, as is illustrated by way of example in FIG. 3. The switch-on duration ton of the switch T1 is again dependent on the control signal RS, the magnetization profiles of the primary coil Lp for two different large control signal values being illustrated in the left-hand and right-hand parts of FIG. 3. A quadratic dependence between the switch-on duration ton—and thus the magnetization duration Tm and the control signal RS—and the mean power consumption results in the fixedly clocked operation.

The linear dependence of the output power emitted by a switching converter on the control signal in the free-running operation and the quadratic dependence of this power on the control signal are illustrated in FIG. 4, in which the emitted output power is illustrated against the control signal. As is furthermore revealed in FIG. 4, the emitted output power is also dependent on the input voltage in the free-running operation.

One advantage of free-running flyback converter switched-mode power supplies is their high efficiency. They are therefore increasingly being used for compact power supply units in closed plastic housings, because the heat emission that is permissible in the case of such housings is severely limited. Unlike in the case of fixedly clocked switched-mode power supplies, in the case of free-running/ quasi-resonant switched-mode power supplies, however, the instantaneous switching frequency changes with the power consumption of the load, the information about this power consumption being fed back to the drive circuit of the switch by means of the control signal. In the case of free-running switching converters, this switching frequency of the switch increases as the power consumption of a connected load decreases, as a result of which the switching losses increase and the efficiency decreases in the case of small power levels to be emitted. Moreover, problems due to EMC radiation increase as the switching frequency of the switch increases.

Solution approaches for avoiding excessively high switching frequencies in the case of small power emissions are described for example in DE 44 37 459 C1, DE 197 32 169 A1, U.S. Pat. No. 6,229,716 or DE 199 39 389 A1. What is common to these solutions is that, in the case of a flyback converter switched-mode power supply, after a magnetization of the primary coil, a waiting time comprising a few periods of a sinusoidal free transformer oscillation following this demagnetization elapses before the switch is closed again. In this case, the number of oscillation periods which the waiting time comprises is dependent on the control signal. What is problematic in this case is that any change in the number of oscillation periods which the waiting time comprises results in an abrupt change in the transfer characteristic of the switching converter with regard to the control signal. Any such abrupt change entails a switch-on process which results at least in a temporary ripple of the output voltage. In the extreme case, these abrupt changes may lead to instabilities in the overall system.

In order to avoid EMC problems DE 102 42 218.4 describes a method for driving a switch in a switching converter, which provides for a plurality of switch-on and switch-off processes to be carried out during a drive period in the free-running operation, the duration of at least one switch-on pulse being modulated from drive period to drive period within a predetermined time range and the switch-on durations of the remaining switch-on pulses within a drive period being coordinated with the time duration of the modulated switch-on pulse such that, with a control signal remaining the same, the mean power consumption per drive period is at least approximately constant. In the case of such a method, a frequency modulation of the switching frequency is achieved in the free-running operation with the load remaining the same, as a result of which EMC problems are reduced.

In order to control the power consumption of a switching converter, U.S. Pat. No. 6,275,018 B1 additionally discloses driving the switch that determines the power consumption in each case by means of drive pulses of the same length, the frequency of these drive pulses over time being dependent on the required power consumption. In this case, on the one hand, the time duration between the individual drive pulses may vary and, on the other hand, in the case of a burst mode in which a number of pulses spaced apart uniformly are generated, the number of drive pulses per burst may vary.

U.S. Pat. No. 6,304,473 describes a drive circuit for driving a switch that controls the power consumption in a switching converter, the drive circuit having a pulse generator, a control circuit which is connected between the pulse generator and the switch to be driven and influences the pulse frequency, and a control circuit which is connected to the pulse generator and influences the shape of the pulse signal.

It is an aim of the present invention to provide a method for operating a switching converter which ensures an effective operation of the switching converter with small losses. It is additionally an aim of the invention to provide a drive circuit for driving a switch in a switching converter which ensures an effective operation of the switching converter.

SUMMARY

These aims are achieved by means of a method and by means of a drive circuit in accordance with embodiments of the invention.

In the case of the method according to the invention for operating a switching converter which has input terminals for the application of an input voltage, output terminals for the provision of an output voltage, a series circuit comprising an inductive energy storage element and a switch driven in clocked fashion, said series circuit being coupled to the input terminals, and a rectifier circuit, which couples the inductive energy storage element to the output terminals, and in which a control signal dependent on the output voltage is available, provision is made for operating the switching converter in free-running or fixedly clocked fashion in a manner dependent on the magnetization duration of the inductive storage element during a drive period of the switch.

In this case, in the free-running operating state, the switch-on duration of the switch is dependent on the control signal during a drive period during which the switch is closed and opened at least once and the switch is switched on again in a manner dependent on a magnetization state of the inductive storage element. In the fixedly clocked operating state, the switch-on duration of the switch is likewise dependent on the control signal during a drive period during which the switch is closed and opened at least once, but the switch is switched on again after a drive period in a manner dependent on a clock signal with a predetermined frequency.

The switch-over from free-running to fixedly clocked operation is preferably effected when the magnetization duration of the inductive storage element falls below a prescribed first reference value during a drive period, that is to say when the switching frequency rises above a frequency value corresponding to the reciprocal of said first reference value when the power consumption decreases. Conversely, a switch is made from the fixedly clocked to the free-running operating state if the magnetization duration rises above a prescribed second reference value during a drive period of the switch owing to an increasing power consumption.

Due to the above-explained different dependence of the power consumption of the switching converter on the control signal in fixedly clocked and free-running operation, in the quadratic dependence of the power consumption on the control signal in the fixedly clocked operation and the proportionality between the power consumption and the control signal in the free-running operation, one embodiment of the method according to the invention provides, in the event of an operating state change, for the control signal to be adapted in such a way that no jump in the power consumption results from the operating state change with the load remaining the same. The adaptation may be effected for example in such a way that, during one operating state, the control signal present in the system is used directly for setting the switch-on durations of the switch, while the control signal in the other operating state is weighted with a multiplication factor which is dependent on one of the reference values and the period duration of the clock signal. If, for the free-running operation, for example, the control signal available in the converter is used directly for setting the switch-on duration, then this control signal is multiplied by a factor greater than one in the event of the transition to fixedly clocked operation. This achieves, directly after the switch-over, a longer switch-on duration of the switch and during the previous free-running operation, so that the power consumption, taking account of the time durations in which the coil is not magnetized which occur in the fixedly clocked operation, initially does not change in the event of the operating state change. In the event of a further decrease in the control signal, the switch-on duration in the fixedly clocked operation then decreases, of course, in order to reduce the power consumption. It is assumed that the efficiency of the switching converter is sufficiently high. Power emission and power consumption can thus approximately be equated.

The multiplication factor by which the control signal is to be multiplied in the event of the operating state transition can be determined mathematically to an approximation using the reference time durations and the period duration of the clock signal, but this factor is expediently determined experimentally for each circuit or precisely adjusted experimentally after a provisional mathematical calculation, in order, in particular, to be able to take account of the fact that, in the case of a free-running operation of the switching converter, the switch is normally not switched on immediately if the coil is demagnetized, but rather not until the first zero crossing of the subsequent free transformer oscillation in the case of a flyback converter. The result of this is that the power consumption in the free-running operation is not exactly proportional to the switch-on duration of the switch.

One embodiment of the method provides, in the fixedly clocked operation, for precisely one switch-on/switch-off process of the switch to be carried out during a drive period, which corresponds to the period duration of the clock signal in the fixedly clocked operation, that is to say for the inductive storage element to be magnetized once and demagnetized once.

A further embodiment provides in the fixedly clocked operation, for a plurality of successive switch-on and switch-off processes of the switch to be carried out during a drive period, the switch-on duration after each switch-on being dependent on the control signal. The number of switch-on and switch-off processes per drive period is fixedly prescribed, but this number is preferably adjustable and can thus also be changed during operation. In the case of this "burst operation" the power consumption during a drive period is distributed between a plurality of magnetization/demagnetization processes, which has the advantage that the current consumption per switch-on and switch-off process is lower than in the case of only one switch-on and switch-off process per drive period, as a result of which the inductive energy storage element can be reliably prevented from attaining the saturation region. A first switching-on of the switch during this burst operation is effected according to the clock signal, and the further switch-on processes are then preferably effected if the storage element is demagnetized again after the preceding switch-on process.

A development of the burst operation explained previously provides for N, where $N \geq 2$, switch-on and switch-off processes to be carried out within a drive period in the fixedly clocked operation, the switch-on durations being constant in the case of N—K switch-on and switch-off processes and the switch-on duration being dependent on the control signal only in the case of K switch-on and switch-off processes. Furthermore, the number N of switch-on and switch-off processes is dependent on the control signal. K is preferably equal to one. If the control signal decreases in this method, so that the length of the switch-on pulse that is modulated in a manner dependent on the control signal becomes zero, then one switch-on pulse fewer is generated during the next drive period, the length of precisely one switch-on pulse again being modulated by the control signal. This process can be repeated until only one switch-on pulse is generated, the length of which is modulated by the control signal. By contrast, if the control signal rises until the length of the switch-on pulse modulated by the control signal reaches the constant switch-on duration of the other N−1 switch-on pulses, then a switch-on pulse is added in the next drive period, and the duration of precisely one pulse is modulated again in a manner dependent on the control signal. This method enables a particularly exact setting of the power consumption in a manner dependent on the control signal.

One embodiment of the method provides, in the free-running operation, for a plurality of switch-on and switch-off processes to be carried out during a drive period, the duration of at least one switch-on pulse being modulated within a prescribed time range from drive period to drive period and the switch-on durations of the remaining switch-on pulses within a drive period being coordinated with the time duration of the modulated switch-on pulse such that, with a control signal remaining the same, the mean power consumption per drive period is at least approximately constant. Such a drive method is explained thoroughly in the German patent application DE 102 42 218.4 already mentioned above, to which reference is hereby made. In the case of such a method, in the free-running operation, a frequency modulation of the switching frequency is achieved with the load remaining the same, as a result of which EMC problems are reduced.

Both in the free-running operation and in the case of the above-explained burst operating mode in the fixedly clocked operation, the switch is switched on again preferably when the inductive storage element is free of energy or demagnetized the first or second time after the switching off of the switch. As explained, in the case of a flyback converter, after a demagnetization of the primary coil, which forms the inductive energy storage element in the case of such a converter, so-called free transformer oscillations are produced, during which the primary coil is magnetized and demagnetized with an attenuated sinusoidal profile. In the case of a first demagnetization after a process of switching on again, the magnetization of the primary coil strives toward a magnetization with an opposite sign with respect to the magnetization during the switch-on process, so that a process of switching on again, at this point in time, is less favorable for loss reasons than during the next zero crossing of the transformer oscillation, that is to say during the second complete demagnetization of the coil, when the magnetization netization thereof strives toward a magnetization with the same sign as during the switch-on process.

The invention's drive circuit for driving a switch connected in series with an inductive storage element in a switching converter which is designed to provide an output voltage from an input voltage comprises an output terminal for providing a clocked drive signal for the semiconductor switch, a first input terminal for feeding in an output voltage signal dependent on the output voltage, a second input terminal for feeding in a magnetization signal dependent on a magnetization state of the inductive storage element, and a controller arrangement, which provides a control signal from the output voltage signal. The drive circuit additionally comprises a signal generating circuit, to which the control signal, the magnetization signal and an operating state signal are fed and which generates, depending on the operating state signal, a drive signal for a free-running or a fixedly clocked operation of the switching converter.

For the free-running operation, the signal generating circuit generates the drive signal in such a way that the switch-on duration of the switch is dependent on the control signal during a drive period during which the switch is closed and opened at least once, and that the switch is switched on again after a drive period in a manner dependent on a magnetization state of the inductive storage element. For the fixedly clocked operation, the signal generating circuit generates the drive signal in such a way that the switch-on duration of the switch is dependent on the control signal during a drive period during which the switch is closed and opened at least once, and that the switch is switched on again after a drive period in a manner dependent on a clock signal with a predetermined frequency.

The drive circuit furthermore comprises a state signal generating circuit, which generates the operating state signal in a manner dependent on a magnetization duration of the inductive storage element during a drive period.

In one embodiment of the invention, the state signal generating circuit generates the operating state signal from the drive signal and the magnetization signal.

In order to adapt the control signal in the event of a switch-over of the operating state from free-running to fixedly clocked, or vice versa, one embodiment provides for the operating state signal to be fed to the controller arrangement, a gain of the controller arrangement being dependent on the operating state signal.

As an alternative, a weighting unit is connected between the controller arrangement and the signal generating circuit and multiplies the control signal present at the output of the controller arrangement by a first or second weighting factor according to the operating state signal.

BRIEF DESCRIPTION OF THE DRAWINGS

The present invention is explained in more detail below using exemplary embodiments with reference to figures, in which:

FIG. 11 shows a temporal profile of the magnetization of the inductive energy storage element in the fixedly clocked operation in the case of a plurality of switch-on/switch-off processes per drive period, FIG. 13 shows the temporal profile of the magnetization of the inductive energy storage element in the free-running operation in the case of more than one switch-on/switch-off process per drive period.

DETAILED DESCRIPTION

In the figures, unless specified otherwise, identical reference symbols designate identical parts and signals with the same meaning.

Figure 1:
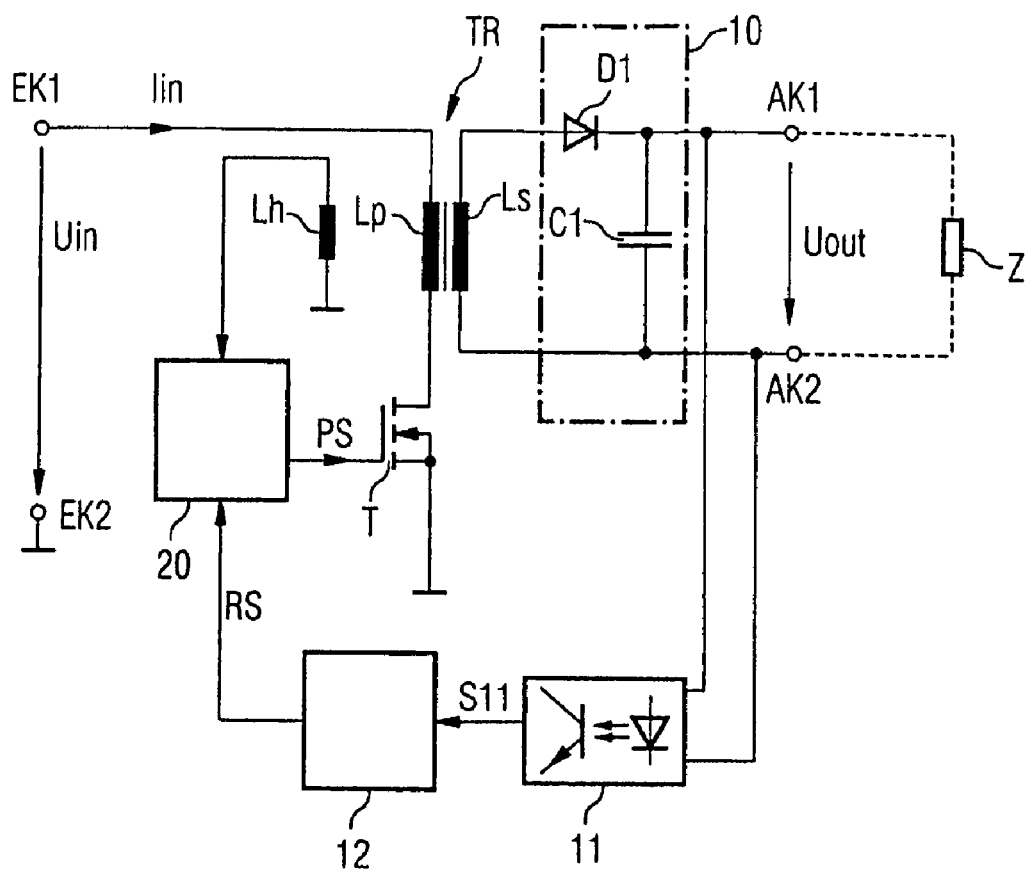
FIG. 1 shows a basic circuit topography of a flyback converter according to the prior art.
Figure 2:
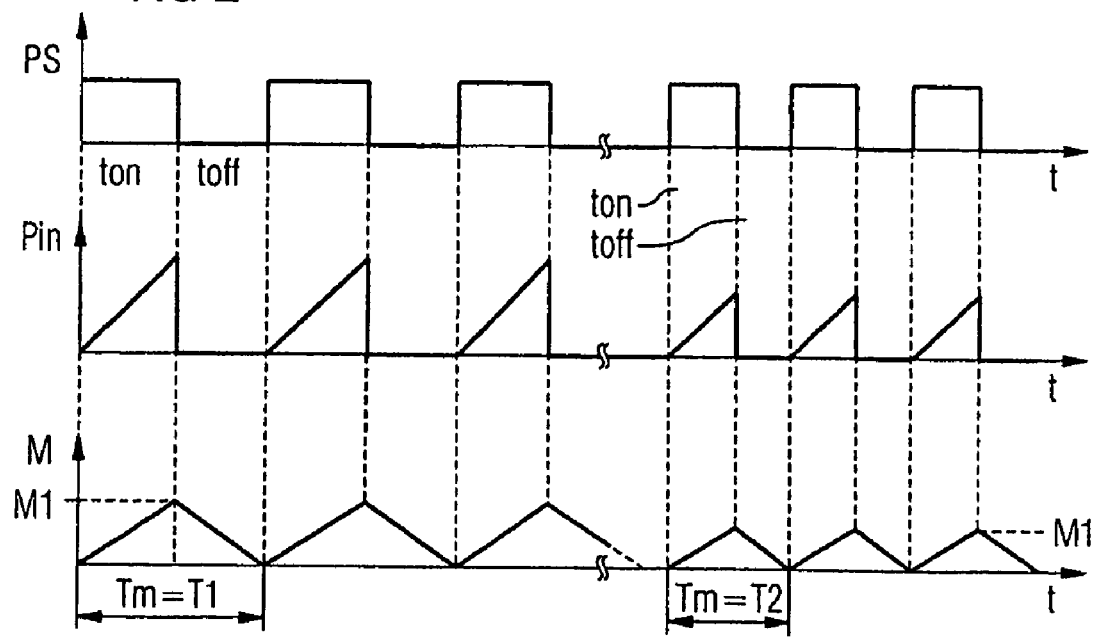
FIG. 2 shows exemplary temporal profiles of a drive signal for a switch in the switching converter, of the temporal profile of the power consumed, and of the magnetization of a primary coil connected in series with the switch in the case of free-running operation of the switching converter.
Figure 3:
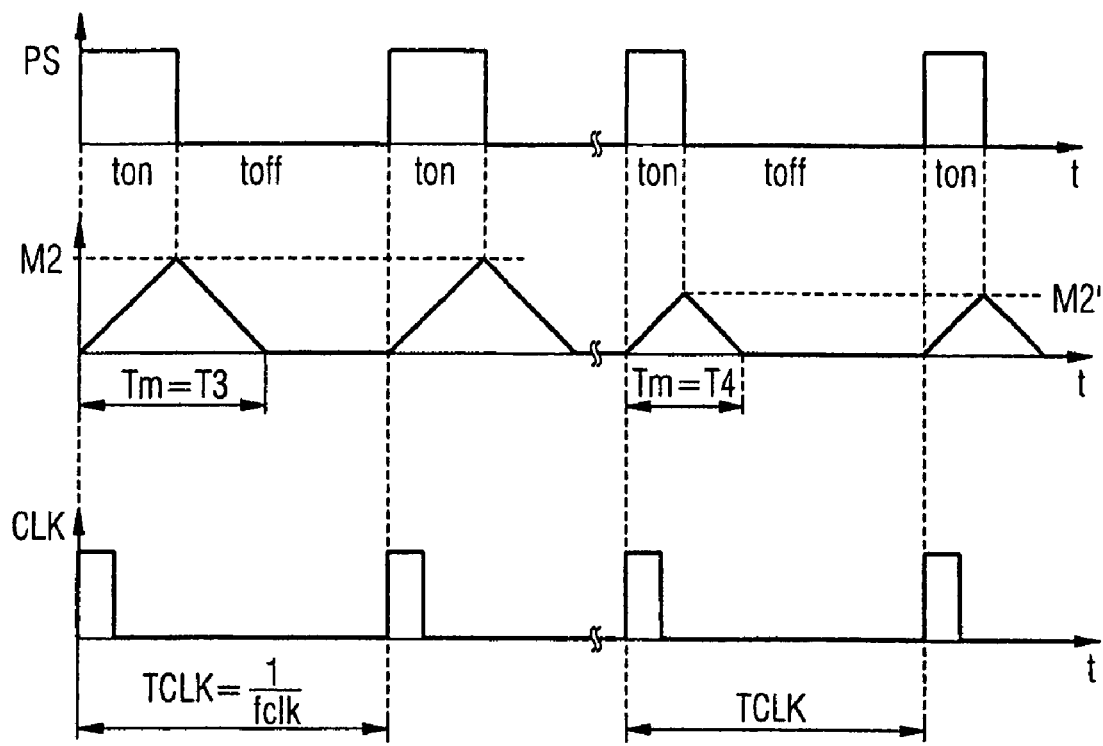
FIG. 3 shows exemplary temporal profiles of the drive signal, of the magnetization profile and of a predetermined clock signal for a fixedly clocked operation of the switching converter.
Figure 4:
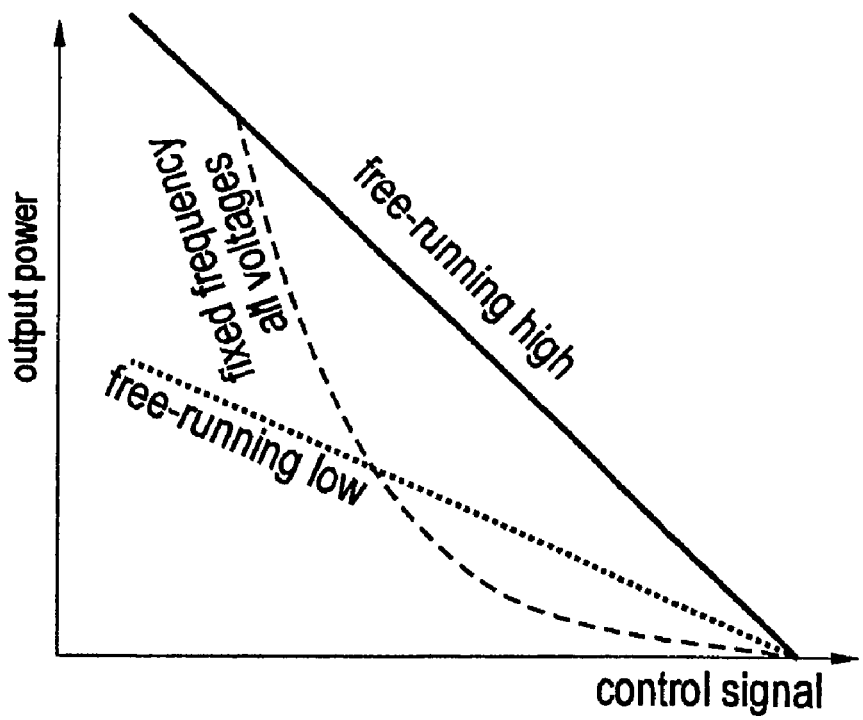
FIG. 4 shows a diagrammatic illustration of the dependence of an output power emitted by a switching converter as a function of an output-voltage-dependent control signal for a free-running and fixedly clocked/fixed-frequency operation of switching converters.

In order to provide a better understanding of the method according to the invention, reference is made below in part to the circuit components of the flyback converter in accordance with FIG. 1. It should be pointed out that the method according to the invention is not, of course, restricted to the operation of flyback converters, but rather can be applied, of course, to any desired switching converters, in particular buck converters.

Figure 5:
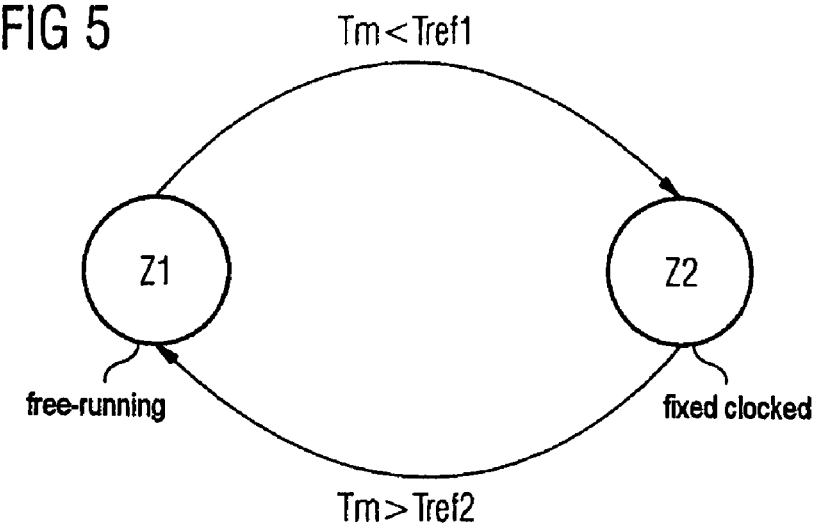
FIG. 5 shows a state diagram for the operation of the switching converter in the fixedly clocked or free-running operating state.

The method according to the invention provides for operating a switching converter in a manner dependent on a magnetization duration Tm of an inductive energy storage element Lp, which is present in the switching converter and is connected in series with a switch driven in clocked fashion, in a free-running operating state Z1 or a fixedly clocked operating state Z2, as is illustrated diagrammatically in FIG. 5 on the basis of a state diagram. In this case, a state transition from the free-running to the fixedly clocked operating state is effected when the magnetization duration Tm during the free-running operation becomes less than a first reference duration Tref1. As already explained in the introduction, during the free-running operation, the magnetization duration is proportional to the output power emitted and inversely proportional to the switching frequency, so that a transition is made from the free-running to the fixedly clocked operation if the switching frequency is higher than the reciprocal of the first reference duration Tref1. In this case, this frequency at which a switch-over is made from the free-running to the fixedly clocked operation is preferably chosen such that it lies in a range in which, in the event of a further rise in the switching frequency in the free-running operation, the switching losses would rise disproportionately.

A transition from the fixedly clocked operating state Z2 to the free-running operating state Z1 is effected when the magnetization duration Tm during the fixedly clocked operation is greater than a second reference time Tref2.

Figure 6:
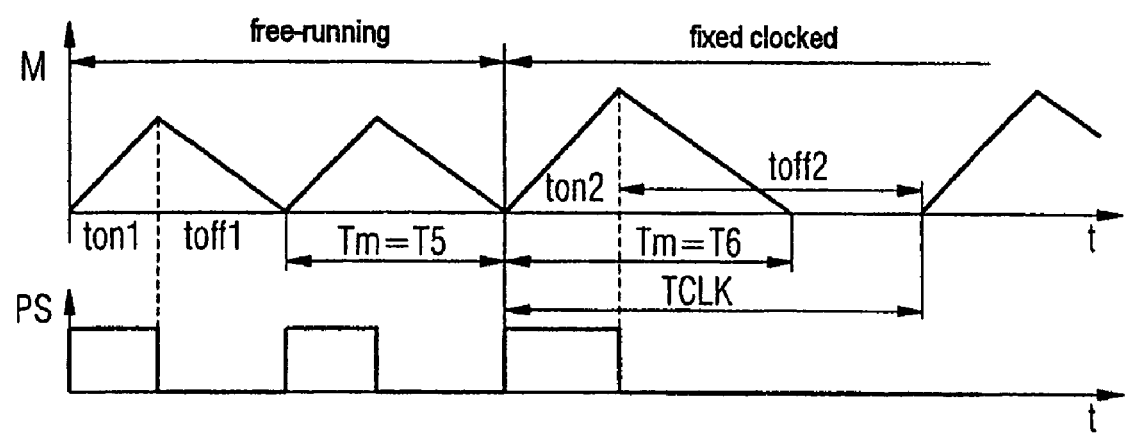
FIG. 6 shows magnetization profiles of an inductive energy storage element in a switching converter in the case of a transition from a free-running to a fixedly clocked operating state.

FIG. 6 illustrates the temporal profile of the magnetization M of an inductive energy storage element, which is connected in series with a switch driven in clocked fashion in a switching converter and is coupled to output terminals of the switching converter via a rectifier arrangement. In the case of a flyback converter switched-mode power supply, this inductive energy storage element is for example the primary coil of a transformer, as is illustrated for example in FIG. 1. It should be pointed out that the method according to the invention is not, of course, restricted to flyback converters, but rather can be employed in any desired switching converters which have an inductive energy storage element connected in series with a switch driven in clocked fashion.

FIG. 6 illustrates the magnetization profile M of this inductive energy storage element in the event of a transition from a free-running to a fixedly clocked operation of the switching converter. For the idealized illustration in FIG. 6, it is assumed that, in the free-running operation, the switch is in each case switched on for a switch-on duration ton1, during which the magnetization M rises and that the switch, after switching off, after a switch-off time toff1 has elapsed, is immediately switched on again when the magnetization M has returned to zero, that is to say the energy storage element is completely demagnetized. The sum of the switch-on duration ton1 and the switch-off duration toff1 corresponds to the magnetization duration Tm, Tm=T5 being assumed for the further consideration for this magnetization duration Tm in the free-running state before the switch-over to the fixedly clocked state.

For the further consideration, it is firstly assumed that the switch is switched on for a switch-on duration ton2 in the fixedly clocked operation after the switch-over from the free-running to the fixedly clocked operation state. After the demagnetization of the inductive storage element, however, the switch is not immediately switched on again, rather the switch is switched on again only after a clock period Tclk has elapsed, which prescribes the beginning of the switch-on pulses. Consequently, in the fixedly clocked operation, the switch-off duration toff2 results from a demagnetization time, corresponding to the time duration between the switching off of the switch and the completed demagnetization, and a waiting time, dependent on the clock period duration Tclk, until the switch is switched on again. In the illustration in accordance with FIG. 6, the magnetization time Tm corresponds to the time duration for which the inductive energy storage element is magnetized during the clock period Tclk, that is to say the time duration between the switching on of the switch and the complete demagnetization of the inductive energy storage element. Tm=T6 is assumed for the further consideration for said demagnetization duration Tm.

As already explained in the introduction, the switch-on durations ton1, ton2 in the free-running and fixedly clocked operation are in each case dependent on a control signal RS controlling the power consumption, said control signal being dependent on the output voltage. In order to obtain no jump in the power consumption or no jump in the output voltage Uout in the event of the transition from the free-running to the fixedly clocked operation and in the event of the transition from the fixedly clocked to the free-running operation, under the idealizing assumption of a constant load, it is necessary to adapt the control signal during the change in the operating state, as is explained below.

The following holds true for the energy of the inductive energy storage element taken up during a switch-on and switch-off process of the switch:

$$W = 0.5 \cdot a \cdot Tm^2 \quad (1),$$

where a is a constant that is dependent on the properties of the component constant used and Tm is the magnetization duration M. The following holds true for the mean power Pin consumed in the free-running operation:

$$Pin = W/TM = 0.5 \cdot a \cdot Tm \quad (2),$$

the mean power consumed is thus proportional to the magnetization duration Tm. In the fixedly clocked operation, the following holds true for the mean power Pin consumed:

$$Pin = W/Tclk = 0.5 \cdot a \cdot Tm^2/Tclk \quad (3),$$

were Tclk is the clock period of the clock signal.

The mean power is thus in proportion to the square of the magnetization duration Tm and, in the case of a magnetization duration Tm that is constant over a plurality of periods, inversely proportional to the clock period Tclk.

Under the assumption made above that Tm=T5 holds true for the magnetization duration shortly before the change in the operating state and Tm=T6 holds true after the change in the operating state, and under the condition that the mean power Pin consumed is to be constant before and after the change in the operating state, the following holds true after inserting Tm=T5 and Tm=T6 into equations (2) and (3) and after equating these relationships:

$$T6 = \sqrt{T5 \cdot Tclk} \quad (4).$$

Assuming that the clock period Tclk is greater than the magnetization duration Tm=T5 before the change in the operating state, it is necessary to increase the magnetization duration Tm in the fixedly clocked operation compared with the free-running operation in order that the mean power Pin consumed is kept constant, which is immediately evident in view of the waiting time in FIG. 6.

In the event of the change in the operating state, T5 corresponds to the first reference time duration Tref1, in the case of which a switch-over is made from the free-running to the fixedly clocked operation. The clock period Tclk and said first reference time duration Tref1, which is preset, are known, as a result of which the ratio between said clock period b=Tclk/Tref1 is also known, so that equation (4) can be rewritten as:

$$T6 = Tref1 \cdot \sqrt{b} \quad (5).$$

Since, as explained, the magnetization durations in both free-running and fixedly clocked operation are directly proportional to the switch-on durations (ton1 and ton2 in FIG. 6), the following must hold true for a first control signal RS1, which brings about a switch-on duration ton1 in the free-running operation, and a second control signal RS2, which brings about the second switch-on duration ton2 in the fixedly clocked operation, under the precondition of identical power consumptions in the free-running and fixedly clocked operation at the switch-over instant:

$$RS2 = RS1 \cdot \sqrt{b} \quad (6).$$

Assuming that the first control signal for controlling the power consumption in the free-running operation is generated from a control signal RS, generated in every switching converter, by multiplication by a gain factor v1, so that the following holds true:

$$RS1 = v1 \cdot RS \quad (7),$$

and assuming that the second control signal RS2 is generated from the control signal RS, present in the switching converter, by multiplication by a second gain factor v2, so that the following holds true:

$$RS2 = v2 \cdot RS \quad (8),$$

the following holds true for the ratio of these two gain factors:

$$v2/v1 = \sqrt{b} \quad (9).$$

This adaptation of the control signal in the event of transition from the free-running to fixedly clocked operation and transition from the fixedly clocked to free-running operation is briefly explained below using an example.

For the clock frequency in the fixedly clocked operation, a no longer audible frequency of 20 kHz is assumed, which results in a period duration Tclk equal to 50 µs. 80 kHz is chosen as the switching frequency which, when reached in the free-running operation, is intended to effect a switch-over to the fixedly clocked operation, and this results in a first reference time Tref1=1/80 kHz=12.5 µs. The ratio of period duration Tclk in the fixedly clocked operation and the switch-over frequency Tref1 in the free-running operation is b=Tclk/Tref1=4(=50 µs/12.5 µs), so that the control signal RS, present in the switching converter, in the event of the transition to the fixedly clocked operation, has to be multiplied by a factor $2=\sqrt{4}$ in order to achieve the same mean power as in the free-running operation with the load remaining the same in the fixedly clocked operation. Accordingly, the control signal is divided by 2 in the event of the transition from fixedly clocked operation to free-running operation.

Finally, it should be pointed out that the previously explained determination of the ratio of the gain factors v1, v2 by which a control signal RS present in the switching converter is multiplied in order to set the switch-on durations of the switch in the free-running and fixedly clocked operation is based on the idealizing assumption, likewise explained, that the switch, in free-running operation, is immediately switched on again when the inductive energy storage element Lp is free of energy. In actual fact a delay time usually results between the instant at which the energy storage element is demagnetized for the first time and the instant at which the switch is switched on again, so that the mean power consumed is not exactly proportional to the magnetization duration Tm. In order to take account of such effects, the ratio between the two gain factors v1 and v2 is ideally determined experimentally, it being possible to use the previously explained calculation for the basic setting of the ratio of the gain factors. The actual setting is effected experimentally on the basis of said basic value in that, in the respective switching converter, a switch-over is made from the free-running to the fixedly clocked operation and the output voltage is considered at the switch-over instant. In this case, the ratio of the gain factors v1, v2 is altered until a discernible jump in the output voltage Uout no longer results in the event of switch-over.

As in the free-running operation, in the case of the method according to the invention, the magnetization duration Tm also has to be determined in the case of the fixedly clocked operation of the switching converter in order to switch over from the fixedly clocked to the free-running operation if said magnetization duration becomes greater than the second reference value Tref2. By way of example, the beginning of the switch-on pulse and the instant at which the inductive energy storage element is demagnetized may be used for determining said magnetization duration.

Figure 7:
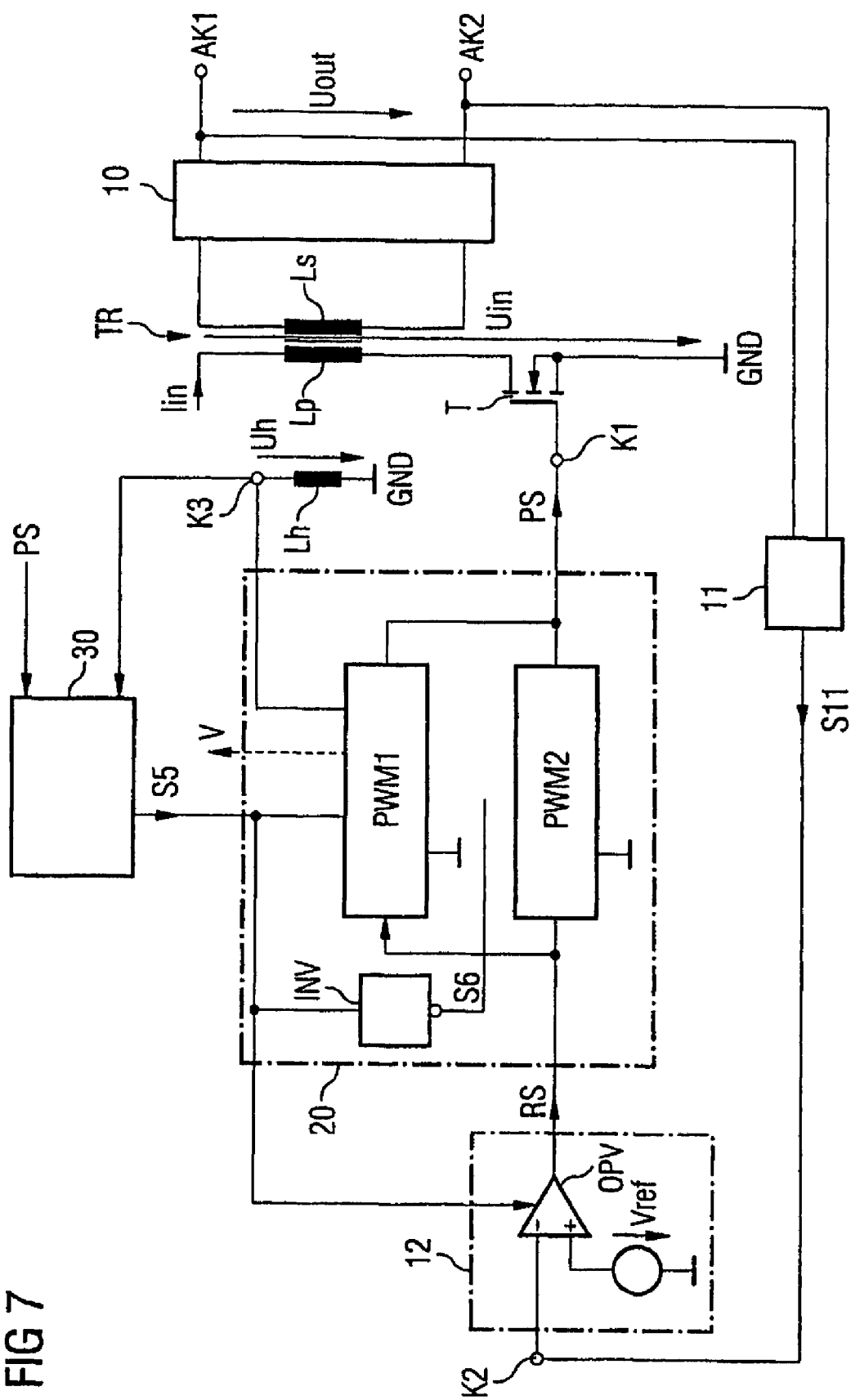
FIG. 7 shows a circuit diagram of a switching converter with a drive circuit according to the invention of the switch in accordance with a first embodiment.

For elucidating a drive circuit according to the invention, FIG. 7 shows a flyback converter with a transformer TR, the primary coil Lp of which is connected in series with a switch T driven in clocked fashion, an input voltage Uin being present across this series circuit. The primary coil Lp is coupled to output terminals AK1, AK2 for the provision of an output voltage Uout via a rectifier arrangement having the secondary coil LS and a rectifier 10 connected downstream, which, by way of example, is constructed in accordance with the rectifier 10 in FIG. 1.

A signal S11 dependent on the output voltage Uout is available in the switching converter and, in the example, is present at the output of an optocoupler 11, which is connected to the output terminals AK1, AK2 and effects a potential isolation between the secondary side and primary side of the transformer TR.

The drive circuit according to the invention comprises an output terminal K1 for providing a clocked drive signal PS for the switch T which is designed as MOSFET in the example. The signal S11 dependent on the output voltage Uout is fed to a first input terminal K2 of the drive circuit. A magnetization signal Uh is fed to a second input terminal K3 of the drive circuit, said magnetization signal being present across an auxiliary coil which is magnetically coupled to the primary coil Lp, so that the magnetization signal Uh is dependent on the magnetization state of the primary coil Lp.

The drive circuit furthermore comprises a controller arrangement 12, to which the output voltage signal S11 is fed and which provides a control signal RS from said output voltage signal. The controller has an integral action (I controller), for example, in the case of which deviations between the output voltage signal S11 and a reference signal Vref1 are integrated upward in order to form the control signal RS. The controller may also have a proportional-integral action.

The control signal RS provided by the controller 12 is fed to a signal generating circuit 20, which provides the clocked drive signal PS in a manner dependent on the control signal RS and an operating state signal S5.

This preferably two-valued operating state signal S5 prescribes whether the signal generating circuit is intended to drive the switch T for a free-running operation or a fixedly clocked operation of the switching converter. In the example, the signal generating circuit comprises a first pulse width modulator PWM1 and a second pulse width modulator PWM2, to each of which the control signal RS is fed and which are switched on and off in a manner dependent on the operating state signal S5 in such a way that only in each case one of the two pulse width modulators PWM1, PWM2 provides a pulse-width-modulated signal which is output as drive signal to the switch T via the output terminal K1.

The pulse width modulators are conventional pulse width modulators, for example, of which the first pulse width modulator PWM1 is designed to generate a drive signal PS for a free-running operation of the switching converter in a manner dependent on the control signal RS.

This pulse width modulator PWM1 is fed the magnetization signal Uh in order to enable the switch T to be switched on again in a manner dependent on the magnetization state of the primary coil Lp. The second pulse width modulator PWM2 is for example a conventional pul-pulse width modulator for generating a pulse-width-modulated drive signal PS for the fixedly clocked operation of the switching converter. For setting the switch-on duration of the switch, it is sufficiently known to compare the control signal RS with a ramp signal. Said ramp signal may be generated internally in the pulse width modulators for example by means of sawtooth generators. Moreover, it is possible for said ramp signal to be generated in a manner dependent on the input current Iin through the primary coil Lp in such a way that the steepness of said ramps is dependent on the input current Iin, as will be explained below on the basis of the further exemplary embodiment in FIG. 8.

The pulse width modulators PWM1, PWM2 are activated or deactivated in a manner dependent on the operating state signal S5, which is effected for example by activation or deactivation of their outputs in a manner dependent on the operating state signal S5 for the outputting of a signal. The activation or deactivation of the pulse width modulators may also be effected by switching on or switching off a voltage supply in the pulse width modulators PWM1, PWM2.

As has been explained previously, the control signal RS has to be adapted in the event of the transition from the free-running to fixedly clocked operation, and vice versa, in order to avoid jumps in the output voltage Uout during the switch-over. In order to adapt said control signal RS, provision is made, in the case of the drive circuit in accordance with FIG. 7, for setting the gain of a control amplifier OPV present in the controller arrangement in a manner dependent on the operating state signal S5, the gain factor of said amplifier OPV assuming two different values in a manner dependent on the operating state signal S5, the ratio of said values corresponding to the ratio of the gain factors v1, v2 explained above. Consequently, the control signal RS assumes the value RS1 for the free-running operation and the value RS2 for the fixedly clocked operation.

Figure 8:
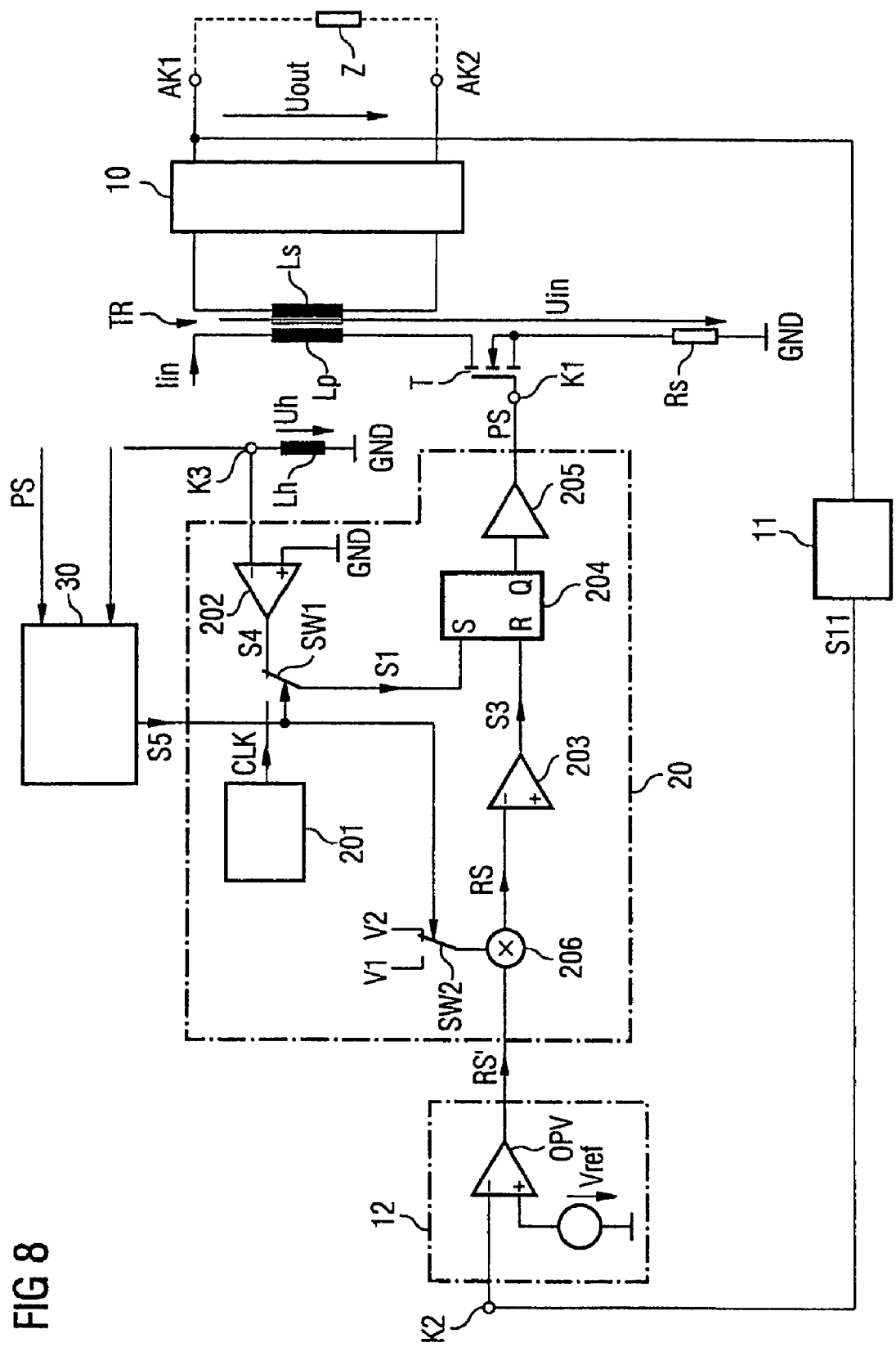
FIG. 8 shows a switching converter with a drive circuit for the switch in accordance with a second embodiment.

FIG. 8 shows a switching converter with a further exemplary embodiment of a drive circuit for providing a clocked drive signal PS for the switch T. In this case, the controller arrangement 12 in accordance with FIG. 8 differs from the controller arrangement in accordance with FIG. 7 by the fact that the control amplifier has a constant gain for the provision of the control signal RS from the output voltage signal S11.

The signal generating circuit 20 comprises an RS flip-flop 204, the known inverting output Q of which is coupled to the output terminal K1 via a gate driver circuit 205. The set input S of the flip-flop 204 is fed a set signal S1, which is made available, according to the operating state signal S5, by a clock generator 201 or by a comparator 202 from the magnetization signal Uh. For this purpose, a switch SW1 driven by the operating state signal S5 is present, which switch connects the set input S to the clock generator 201 or to the comparator 202 in a manner dependent on the signal S5. The reset input R of the flip-flop 204 is fed a reset signal S3, which is made available by a comparator 203 by a comparison from the control signal RS and a ramp signal S2. In the exemplary embodiment, said ramp signal S2 is available across a current sensing resistor Rs connected in series with the primary coil Lp and the switch T. Owing to the input current Iin rising linearly when the switch T is switched on, said ramp signal S2 also rises linearly with the switching on of the switch T, the flip-flop 204 being reset if the ramp signal S2 exceeds the value of the control signal RS.

Figure 9:
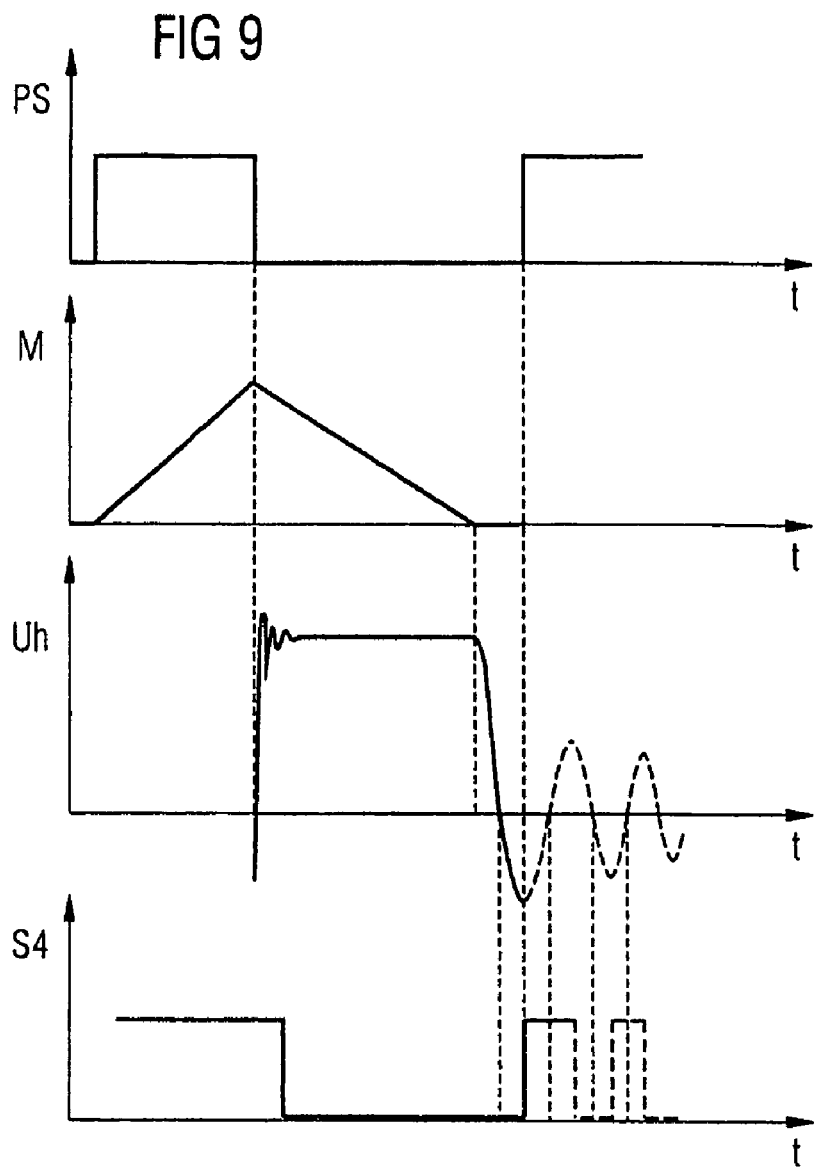
FIG. 9 shows an exemplary temporal profile of a drive pulse for the switch, of a voltage obtained across an auxiliary coil, and of a zero crossing signal derived therefrom.

In the free-running operation of the switching converter, the set signal S1 of the flip-flop 204 corresponds to the output signal S4 of the comparator 202, which generates this signal S4 by comparing the magnetization signal Uh with a reference-ground potential GND. The magnetization signal Uh corresponds to the voltage across an auxiliary coil Lh—coupled to the primary coil Lp—relative to reference-ground potential GND. FIG. 9 shows, by way of example, the profile of said magnetization signal Uh and of the comparator output S4. When the switch T is opened, the voltage across the primary coil Lp and thus also across the auxiliary coil Lh rises and remains at a value greater than zero until the energy previously stored in the primary coil Lp is emitted to the secondary coil Ls and the output terminals AK1, AK2. The voltage Uh across the auxiliary coil Lh begins to fall to zero when the primary coil Lp is free of energy, i.e. demagnetized, and changes polarity a short time later. This is then followed by so-called free transformer oscillations. The delay time of the zero crossing and the frequency of the transformer oscillations depend on the resonant frequency determined by the inductance of the primary coil Lp and parasitic capacitances of the primary coil Lp and of the switch T. The delay time is a quarter of the period duration of the transformer oscillations. The comparator output signal K4 has a first rising edge when the magnetization signal Uh falls below reference-ground potential GND for the first time. The output signal of the comparator S4 is preferably delayed with respect to the magnetization signal Uh by a quarter of the period duration of the transformer oscillations, as is illustrated in FIG. 9. The comparator output signal S4 thus has a delay by half the period duration of the transformer oscillations with respect to the instant of complete demagnetization. After this delay time, the magnetization strives toward positive values again, and the voltage present at the switch T has precisely a minimum, so that it can be switched on with particularly low losses at this point in time. It should be pointed out that when the switch PS is switched on again, the free transformer oscillations and thus the oscillations of the magnetization signal Uh are ended, of course, and the magnetization signal Uh assumes negative values with switch T switched on, and that the free transformer oscillations are nevertheless illustrated in FIG. 9 in order to elucidate this phenomenon.

When the switch T is switched on, the ramp signal S2 rises linearly in accordance with the input current Iin, the switch T remains switched on until the ramp signal reaches the control signal RS, so that the switch-on duration of the switch T is proportional to the control signal RS.

In the fixedly clocked operation, the clock signal CLK is fed to the set input S of the flip-flop 204 via the switch SW1, the clock period of said clock signal corresponding to the clock period Tclk explained above.

For the purpose of adapting the control signal RS in the event of the switch-over from the free-running to the fixedly clocked operation, and vice versa, a weighting unit with a multiplier 206 and a further switch SW2 is present in the signal generating circuit 20, the multiplier being fed, at one input, a control signal RS' provided by the controller and, at a further input, in a manner dependent on the switch position of the switch SW2 and thus in a manner dependent on the operating state signal S5, a first gain factor v1 or a second gain factor v2. Said gain factors v1, v2 correspond to the gain factors explained above, in order to bring about a constant power consumption of the switching converter in the event of a change in the operating state with a constant load and at a constant control signal RS'.

Figure 10:
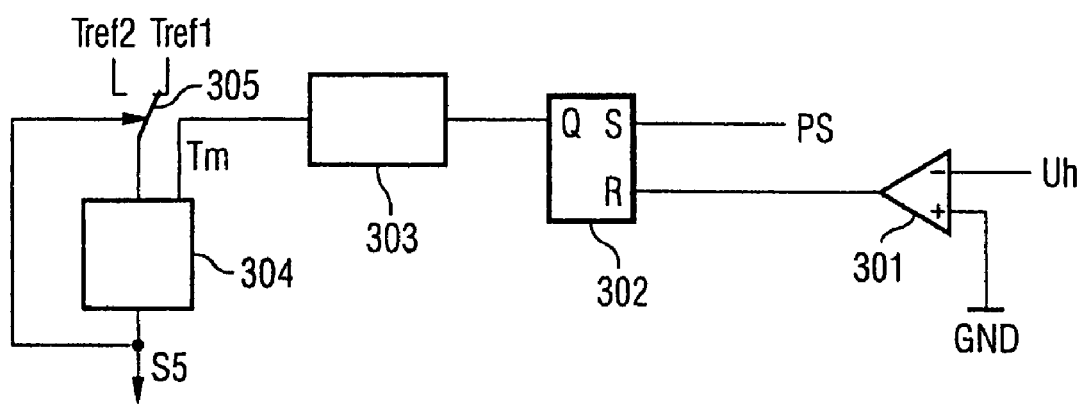
FIG. 10 shows an exemplary embodiment of an operating state signal generating circuit that provides an operating state signal.

FIG. 10 shows an exemplary embodiment of a unit 30, which provides the operating state signal S5 from the drive signal PS of the switch and from the magnetization signal Uh. Said unit 30 has a comparator 301, which, in accordance with the comparator 202 explained previously with reference to FIG. 8, compares the magnetization signal Uh with the reference-ground potential GND and provides a signal S301 dependent on the demagnetization instants of the auxiliary coil Lh and thus of the primary coil Lp. This signal serves for resetting a flip-flop 302, which is set by the drive signal PS when the switch T is switched on. A pulsed signal is available at the non-inverting output Q of said flip-flop 302, the pulse durations of said signal corresponding to the magnetization durations Tm both in the free-running operation and in the fixedly clocked operation. A signal dependent on said magnetization time duration Tm is fed to a comparator unit 304, which compares this signal with the first reference signal Tref1 or the second reference Tref2 in order to provide the operating state signal S5, the first reference signal Tref1 being fed to the comparator unit 304 in a manner dependent on said operating state signal S5, if the operating state signal S5 indicates a free-running operation, in order to be able to switch over to the fixedly clocked operation if the magnetization duration Tm becomes less than the first reference signal Tref1. Correspondingly, the comparator unit 304 is fed the second reference signal Tref2 if the operating state signal S5 indicates a fixedly clocked operation, in order to be able to switch over to the free-running operation if the magnetization duration Tm becomes greater than the second reference value Tref2.

Choosing Tref2 to be slightly greater than $Tref2 > \approx mt;epmrl;$
$\sqrt{italTrefmedbeginbold1 \cdot endbolditalTclkmedrlxmx}$ results in a hysteresis during the switch-over from the fixedly clocked to the free-running operation, and vice versa. Continuous switching back and forth is thus avoided with a constant load.

In the context of the previous explanation of the figures, it was seen that the switch, in the fixedly clocked operation of the switching converter, is driven in such a way that one switch-on and switch-off process takes place per clock period Tclk, as was explained for example in FIG. 6. In this case, the switch-on duration ton2 decreases with decreasing power consumption of a load Z which is connected to the output terminals and is illustrated by way of example in FIG. 8, but the switch-on frequency of the switch T remains constant and is prescribed by the clock period Tclk.

In the case of an embodiment explained with reference to FIG. 11, provision is made for switching on the switch T at least twice successively during a clock period Tclk, the respective switch-on durations being dependent on the respective control signal that determines the fixedly clocked operation. In this case, a first switching on of the switch is effected in a manner dependent on the clock signal with the clock period Tclk. The switching on of the switch during further switch-on and switch-off processes within the clock period Tclk is effected in a manner dependent on the magnetization state of the inductive energy storage element Lp, preferably as soon as the energy storage element is free of energy.

In this embodiment, too, in which the switch is switched on more than once within a drive period Tclk and in which the respective switch-on durations are depenpendent on the control signal, the total magnetization duration Tm, that is to say the time duration between the first switching on of the switch within the clock period Tclk and the instant at which the switch is free of energy after the last switching on within the clock period Tclk, is proportional to the control signal and the mean power consumption is proportional to the square of said magnetization duration Tm. The number of switch-on and switch-off processes per clock period Tclk is fixedly prescribed over a plurality of clock periods Tclk, but may be varied, in principle, in which case, in the event of a change in the number of switch-on and switch-off processes, it is necessary to adapt the ratio between the gain factors v1, v2 in the event of the transition from the free-running to the fixedly clocked operation, and vice versa. This ratio v2/v1 must be multiplied by a factor $\sqrt{n/m}$ where n represents the previous number of switch-on and switch-off processes within the clock period Tclk and m represents the number of switch-on and switch-off processes within the clock period Tclk. It emerges from this that said ratio v2/v1 has to be multiplied by a factor $\sqrt{0.5}$ if, instead of one switch-on pulse, two successive switch-on pulses whose length is dependent on the control signal are generated in the fixedly clocked operation.

Figure 12A:
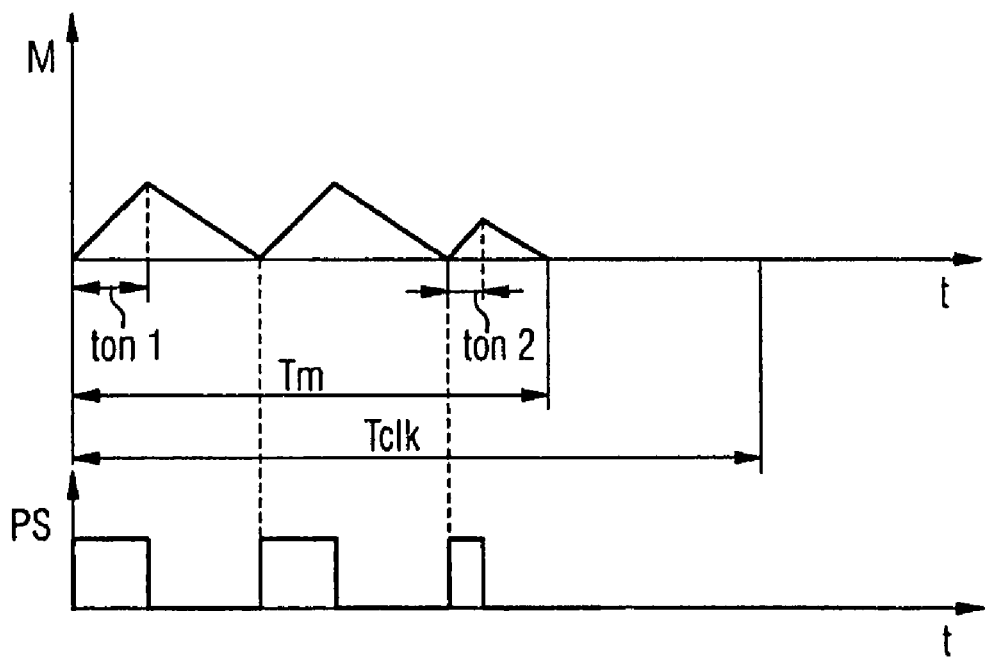
FIG. 12 shows the temporal profile of the magnetization of the inductive energy storage element in the fixedly clocked operation in the case of a plurality of switch-on/switch-off processes per drive period, the duration of a switch-on pulse being dependent on a control signal.

FIG. 12a illustrates a further method for driving the switch in the fixedly clocked operation of the switching converter, here N switch-on pulses being generated per clock period Tclk, the switch-on duration ton1 of N—K switch-on pulses, of two switch-on pulses in the example illustrated, being constant and the switch-on duration of K switch-on pulses, of one switch-on pulse in the present case, being dependent on the respective control signal. Furthermore, the number N—K of switch-on pulses with a constant length is also dependent on the control signal. If, in the example illustrated, the power consumption of the load decreases, for example, then the switch-on duration ton2 of the switch-on pulse dependent on the control signal is first of all reduced. If said switch-on duration ton2 returns to zero with a decreasing power consumption of the load, then the number of constant pulses is reduced by 1, so that the duration of a switch-pulse is again dependent on the control signal.

Figure 12B:
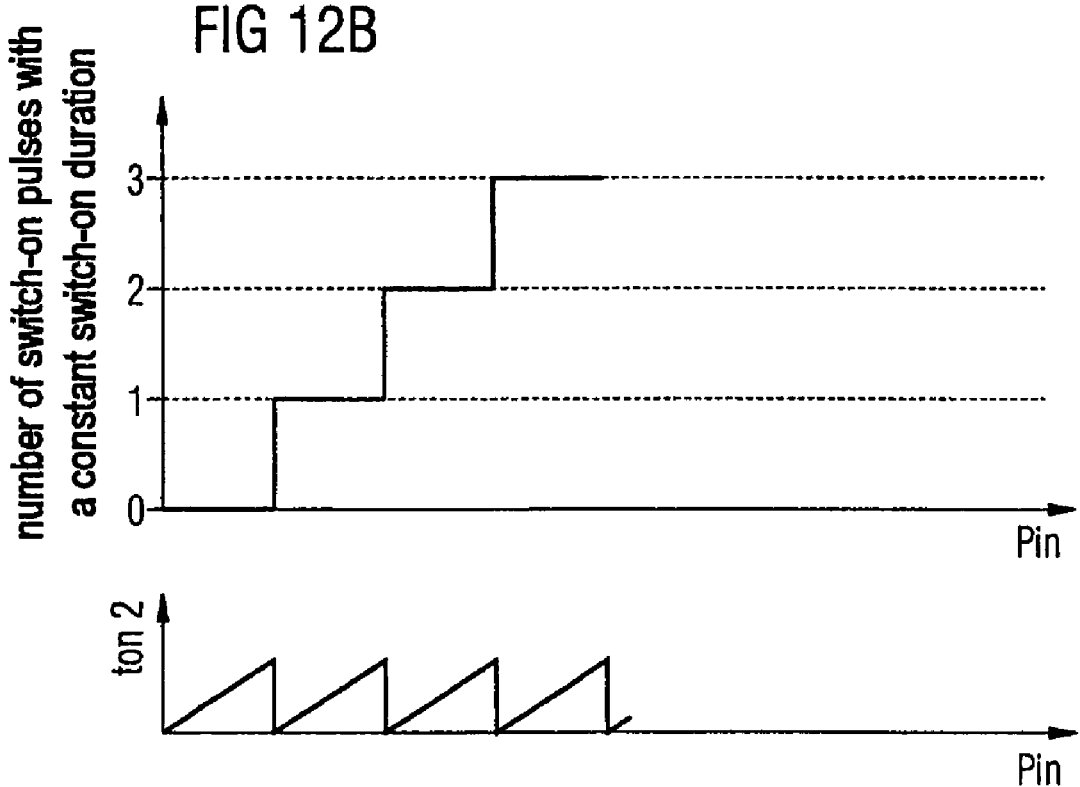

FIG. 12b diagrammatically shows the switch-on duration ton2 of the one switch-on pulse dependent on the control signal, and also the number of switch-on pulses with a constant time duration dependent on the power consumption of the load.

FIG. 13 illustrates in detail a driving of the switch T in the free-running operation in accordance with a method explained in DE 102 42 218.4 in which, in the free-running operation, too, at least two switch-on and switch-off processes of the switch are effected during a drive period, the switch-on duration of at least one pulse being modulated within a predetermined time range and the switch-on duration of the at least one other switch-on pulses being adapted to the switch-on duration of the modulated switch-on pulse such that the mean power consumption of the switch remains constant with a constant control signal. In the case of the illustration in FIG. 13, the special case is present here that the switching-on durations of two successive switch-on pulses are dependent on the control signal and the time duration of a third switch-on pulse is modulated in a manner dependent on said control signal in a predetermined time range, said time range being chosen such that the mean power consumption remains largely constant, but an appreciable variation of the switching frequency is achieved.

The invention claimed is:
1. A method for operating a switching converter which has input terminals coupled to receive an input voltage, output terminals, a series circuit comprising an inductive energy storage element and a switch driven in clocked fashion, said series circuit being coupled to the input terminals, and a rectifier circuit which couples the inductive energy storage element to the output terminals, and in which a control signal dependent on an output voltage at the output terminals is generated, the method comprising:

selectively operating the switching converter in a free-running operating state in which a switch-on duration of the switch is dependent on the control signal during a drive period during which the switch is closed and opened at least once, and in which the switch is switched on again after a drive period in a manner dependent on a magnetization state of the inductive storage element;

selectively operating the switching converter in a fixedly clocked operating state in which a switch-on duration of the switch is dependent on the control signal during a drive period during which the switch is closed and opened at least once, and in which the switch is switched on again after a drive period in a manner dependent on a clock signal with a predetermined frequency, and transitioning from the free-running operating state to the fixedly clocked operating state dependent on the magnetization duration of the inductive storage element during a drive period.

2. The method as claimed in claim 1, in which the switch-on duration is set in a manner dependent on a first control signal during the free-running operation and in a manner dependent on a second control signal during the fixedly clocked operation, the second control signal having a value that is proportionally related to a corresponding value of the first control signal.

3. The method as claimed in claim 2, in which the first control signal corresponds to the control signal, and in which the value of the second control signal constitutes a multiplication by a gain factor of the corresponding value of the control signal.

4. The method as claimed in claim 1 further comprising effecting one switch-on/switch-off process of the switch during a drive period in the fixedly clocked operation.

5. The method as claimed in claim 1 further comprising effecting at least two switch-on/switch-off processes of the switch during a drive period prescribed by the clock signal in the fixedly clocked operation, each switch-on/switch-off process having a switch-on duration, each switch-on duration being dependent on the control signal.

6. The method as claimed in claim 1 further comprising effecting N switch-on/switch-off processes of the switch during a drive period prescribed by the clock signal in the fixedly clocked operation, where N≧2, each switch-on/switch-off process having a switch-on duration, a number K of the switch-on durations being dependent on the control signal and a number N—K switch-on durations being independent of the control signal.

7. The method as claimed in claim 6, in which K=1.

8. The method as claimed in claim 4, in which the switch is switched on again within the drive period in a manner dependent on a magnetization state of the inductive storage element.

9. The method as claimed in claim 8, further comprising switching on the switch when the inductive energy storage element is free of energy for at least a second time after the switching-off of the switch.

10. The method as claimed in claim 1, further comprising effecting at least two switch-on/switch-off processes of the switch during a drive period during the free-running operation, each switch-on/switch-off process having a switch-on duration, each switch-on duration being dependent on the control signal.

11. The method as claimed in claim 10, in which the switch-on durations are modulated during the at least two switch-on/switch-off processes within a predetermined time range in such a way that the mean power consumption of the inductive energy storage element remains substantially constant when the control signal remains the same.

12. The method as claimed in claim 1, further comprising switching on the switch in the free-running operation when the inductive energy storage element is free of energy at least a second time after the switching-off of the switch.

13. A drive circuit for driving a switch connected in series with an inductive storage element in a switching converter, the switching converter operable to provide an output voltage based on an input voltage, the drive circuit comprising:

an output terminal for providing a clocked drive signal for the switch, a signal generating circuit operably coupled to receive a control signal having a characteristic based at least in part on the output voltage, a magnetization signal having a characteristic dependent on a magnetization state of the inductive storage element and an operating state signal, the signal generating circuit operable to generate the drive signal using one of a first operation or a second operation of the switching converter based on the operating state signal, wherein for the first operation a switch-on duration of the switch is dependent on the control signal during a drive period, and the switch is switched on again after a drive period in a manner dependent on a magnetization state of the inductive storage element, and for the fixedly clocked operation, the switch-on duration of the switch is dependent on the control signal during the drive period, and the switch is switched on again after a drive period in a manner dependent on a clock signal with a predetermined frequency, and a state signal generating circuit configured to generate the operating state signal in a manner dependent on a magnetization duration of the inductive storage element during a drive period.

14. The drive circuit as claimed in claim 13, in which the state signal generating circuit is operable to generate the operating state signal from the magnetization signal and the drive signal.

15. The drive circuit as claimed in claim 13, further comprising a control arrangement operable to generate the control signal based on the output voltage and in a manner dependent on the operating state signal.

16. The drive circuit as claimed in claim 15, wherein the control arrangement has a gain, the gain set by the operating state signal.

17. The drive circuit as claimed in claim 13, wherein the signal generating circuit is further operable to generate the drive signal in the second operation such that one switch-on/switch-off process of the switch occurs during a drive period.

18. The drive circuit as claimed in claim 13 in which the signal generating circuit is further operable to generate the drive signal in the second operation such that at least two switch-on/switch-off processes of the switch occur during a drive period prescribed by the clock signal, each switch-on/switch-off process having a switch-on duration, each switch-on duration being dependent on the control signal.

19. The drive circuit as claimed in claim 13 in which the signal generating circuit is further operable to generate the drive signal in the second operation such that N where N≧2 switch-on/switch-off processes of the switch occur during a drive period prescribed by the clock signal, each switch-on/ switch-off process having a switch-on duration, a number K switch-on durations being dependent on the control signal and a number N—K switch-on durations being independent of the control signal.

20. The drive circuit as claimed in claim 19, in which K=1.

21. The drive circuit as claimed in claim 13 wherein the signal generating circuit is further operable to generate the drive signal such that the switch is switched on within the drive period in a manner dependent on the magnetization signal.

22. The drive circuit as claimed in claim 21, wherein the signal generating circuit is further operable to switch on the switch when the inductive energy storage element is free of energy for at least a second time after a switching-off of the switch.

23. The drive circuit as claimed in claim 13, wherein the signal generating circuit is further operable to generate the drive signal during the first operation such that at least two switch-on/switch-off processes of the switch occur during a drive period, each switch-on/switch-off process having a switch-on duration, each switch-on duration being dependent on the control signal.

24. The drive circuit as claimed in claim 23, wherein the switch-on durations are modulated during the at least two switch-on/switch-off processes such that the mean power consumption of the inductive energy storage element remains constant with the control signal remaining the same.

25. The drive circuit as claimed claim 13, wherein the signal generating circuit is further operable to generate the drive signal such that, in the first operation, the switch is switched on when the inductive energy storage element is free of energy for at least a second time after a switching-off of the switch.

* * * * *